United States Patent [19]

Yano et al.

[11] Patent Number: 4,804,393
[45] Date of Patent: Feb. 14, 1989

[54] METHODS FOR PRODUCING OPTICAL FIBER PREFORM AND OPTICAL FIBER

[75] Inventors: Koji Yano; Minoru Watanabe; Michihisa Kyoto; Masao Hoshikawa, all of Yokohama, Japan

[73] Assignee: Sumitomo Electric Industries, Ltd., Osaka, Japan

[21] Appl. No.: 97,320

[22] Filed: Sep. 11, 1987

Related U.S. Application Data

[63] Continuation of Ser. No. 788,695, Oct. 21, 1985, abandoned, which is a continuation of Ser. No. 643,383, Aug. 23, 1984, abandoned.

[30] Foreign Application Priority Data

Aug. 25, 1983 [JP] Japan .............................. 58-154209

[51] Int. Cl.$^4$ .......................................... C03B 37/018
[52] U.S. Cl. ...................................... 65/3.12; 65/18.2
[58] Field of Search ................... 65/3.12, 18.2, 32, 157

[56] References Cited

U.S. PATENT DOCUMENTS

| | | | |
|---|---|---|---|
| 4,062,665 | 12/1977 | Izawa et al. | 65/13 |
| 4,224,046 | 9/1980 | Izawa et al. | 65/3.12 |
| 4,298,365 | 11/1981 | Bailey et al. | 65/3.12 |
| 4,304,581 | 12/1981 | Saifi | 65/3.12 |
| 4,318,726 | 3/1982 | Edahiro et al. | 65/3.12 |
| 4,406,684 | 9/1983 | Kawachi et al. | 65/900 |

FOREIGN PATENT DOCUMENTS

| | | | |
|---|---|---|---|
| 0041864 | 12/1981 | European Pat. Off. | |
| 54-134128 | 10/1979 | Japan | |
| 56-28852 | 7/1981 | Japan | |
| 92534 | 6/1982 | Japan | 65/3.12 |

OTHER PUBLICATIONS

Suzo et al., "Fibré fabrication by Vapor-Phase-Axial-Deposition Method," *Electronics Letters*, vol. 14, No. 7, 8/17/78 pp. 534–535.
Inada, "Recent Progessing Fiber Fabrication Techniques by Vapor-Phase Axial Deposition", MTT-30(1982) Oct. No. 10 pp. 1412–1419.

*Primary Examiner*—Kenneth M. Schor
*Attorney, Agent, or Firm*—Cushman, Darby & Cushman

[57] ABSTRACT

A method for producing an optical fiber preform comprising jetting a glass raw material mixture containing at least one phosphorous compound and a fuel gas through a burner, hydrolyzing the raw materials in the flame to form fine glass particles, depositing the fine glass particles to form a porous glass preform, and then sintering the porous glass preform in a stream of an inert gas with removing phosphorus liberated from the preform to produce a transparent optical fiber preform, from which transparent optical fiber preform, an optical fiber having low attenuation at a wavelength of about 1.52 micrometer is produced.

8 Claims, 3 Drawing Sheets

METHODS FOR PRODUCING OPTICAL FIBER PREFORM AND OPTICAL FIBER

This is a continuation of application Ser. No. 788,695 filed Oct. 21, 1985 (now abandoned) which was a continuation of application Ser. No. 643,383 filed Aug. 23, 1984 (also abandoned).

FIELD OF THE INVENTION

The present invention relates to methods for producing an optical fiber preform and for producing an optical fiber with low attenuation of light having a wavelength of 1.55 micrometers.

BACKGROUND OF THE INVENTION

Typical methods for producing an optical fiber utilizing a flame hydrolysis reaction include a vapor phase axial deposition method (hereinafter referred to as "VAD method") and an outside vapor deposition method (hereinafter referred to as "OVD method").

In accordance with the VAD method, fine glass particles produced by the flame hydrolysis reaction are applied onto the tip of a rotating seed rod and grown in its longitudinal direction to produce a porous glass preform (see U.S. Pat. No. 4,135,901). That is, gaseous raw materials of glass (eg. $SiCl_4$, $GeCl_4$, $POCl_3$, $BBr_3$, etc.) are fed to a burner together with fuel gas and oxygen, and hydrolyzed and oxidized in a flame to form the fine glass particles. The glass particles are deposited as described above to produce a porous preform, which is then sintered at a high temperature to obtain a transparent glass preform. If necessary after molded to reduce its diameter, the transparent preform is drawn to produce an optical fiber.

For example, U.S. Pat. No. 3,737,292 describes the OVD method. Fine glass particles are formed by flame hydrolysis of the raw materials of glass and layers of the fine glass particles are deposited one by one on an outer surface of an elongate starting member in its radial direction. The starting member is then removed to provide a porous preform. The thus formed porous preform is sintered at a high temperature to obtain a transparent preform, which is then, if necessary after molded to reduce its diameter, drawn to produce an optical fiber.

An optical fiber comprises an inner region having a higher refractive index and an outer region having a lower refractive index, and light is transmitted through the high refractive index area. To provide the optical fiber with such two regions, each region is made of silica as a base material and at least one additive which alters, namely, increases or decreases the refractive index of silica. Specific examples of the additive which increases the refractive index of silica are $GeO_2$, $P_2O_5$, $Sb_2O_3$ and $Al_2O_3$. Specific examples of that decreases the refractive index of silica are $B_2O_3$ and F.

Now, the characteristics of the additives is explained by making reference to $P_2O_5$ as an additive to increase the refractive index of silica. $P_2O_5$ has the following characteristics.

(1) Addition of $P_2O_5$ lowers the softening point of silica and thus facilitates its molding.

(2) In the production of the transparent glass preform from the porous preform by the VAD and OVD methods, $P_2O_5$ acts as a binder for a material having a higher softening point than $P_2O_5$ (eg. $SiO_2$ and $GeO_2$) and thus effectively prevents cracking in the porous preform during its production.

(3) Rayleigh scattering in an optical fiber drawn from the transparent preform containing $P_2O_5$ is less than in that drawn from the transparent preform not containing $P_2O_5$.

Japanese Patent Publication No. 28852/1981 discloses production of a transparent preform containing 2% by weight of $P_2O_5$ by the VAD process. Japanese Patent Kokai Publication (unexamined) No. 134128/1979 discloses a transparent preform containing 4% by weight of $P_2O_5$. Further, U.S. Pat. No. 4,339,173 discloses a preform containing 3% by weight or more of $P_2O_5$.

In recent years, studies have been made on attenuation through the optical fiber at a wavelength of 1.55 micrometers at which the attenuation is minimum. The attenuation at the 1.55 micrometer band through an optical fiber containing phosphorus is, however, large since P-O-H moieties absorb light having a wavelength of about 1.52 micrometers.

If a porous preform not containing phosphorus is to be sintered, for example, in the VAD the sintering temperature should be considerably high. This undesirably requires a high temperature sintering furnace, a shorter operation life of the furnace, a heater and other facilities, and enlarges the size of the power source and an insulating material that are required.

In order to produce an optical fiber with low attenuation at the 1.55 micrometer band, it is important to reduce the amount of $P_2O_5$ contained in the optical fiber. It has now been found that it is desirable for the phosphorus content in the optical fiber to be reduced to $3 \times 10^{-1}$ % by mole or less.

It has also been found that distribution of $GeO_2$ as a dopant to increase the refractive index in the porous glass preform is influenced by the deposition temperature, namely, a surface temperature of the preform, which in turn varies with the concentration of $POCl_3$ or $P_2O_5$ in the flame and, therefore, that the desired distribution of $GeO_2$ can be achieved by controlling the concentration of a phosphorus compound in the raw materials.

Thus, preferably, the following requirements are to be satisfied:

(1) The porous glass preform prepared by deposition of the fine glass particles contains phosphorus in such an amount that the distribution of a dopant can be easily controlled and further that it can be converted into a transparent preform at a lower sintering temperature than a porous glass preform not containing phosphorus at all; and (2) The phosphorus content in an optical fiber fabricated by drawing the preform is lower than that in the preform so that the optical fiber has lower attenuation.

SUMMARY OF THE INVENTION

An object of the present invention is to provide a method for producing an optical fiber preform whereby phosphorus is doped in a step of producing a porous glass preform, but in a step of sintering the porous preform, phosphorus is evaporated off so that the phosphorus content of the ultimate transparent preform is reduced to lower than a certain specific amount.

Another object of the present invention is to provide a method for producing an optical fiber by drawing the transparent preform containing a lower concentration of phosphorus.

Accordingly, the present invention provides a method for producing an optical fiber preform comprising jetting a glass raw material mixture containing at least one phosphorous compound and a fuel gas through a burner, hydrolyzing the raw materials in the flame to form fine glass particles, depositing the fine glass particles to form a porous glass preform, and then sintering the porous glass preform in a stream of an inert gas with removing phosphorus liberated from the preform to produce a transparent optical fiber preform.

The present invention further provides a method for producing an optical fiber comprising drawing a transparent preform produced by the method of the invention to form an optical fiber.

DETAILED DESCRIPTION OF THE INVENTION

The phosphorus content in the transparent preform can be lowered by:

(1) decreasing the amount of the phosphorous compound to be added to the glass raw material in production of the porous glass particle, or (2) in the sintering step, maintaining the flow rate of the inert gas at a certain level or higher and removing phosporus and/or the phosphorous compounds liberated from the porous preform.

In accordance with the procedure (1), it is impossible to control the dopant distribution and to lower the sintering temperature by phosphorus.

Therefore, the procedure (2) was investigated. In order to find relation among the proportion of the phosphorous compound (for example, $POCl_3$) in the starting material mixture, the flow rate of the inert gas (for example, helium) in the sintering step and the $P_2O_5$ content of the resultant transparent preform were several porous preforms produced, the amount of the phosphorous compound in the raw material mixture fed to a burner. The porous preforms were sintered at four different flow rates of helium, i.e. at 0, 1, 3 and 20 1/min., and the resulting transparent preforms were analyzed to determine the content of $P_2O_5$.

Figure 1:
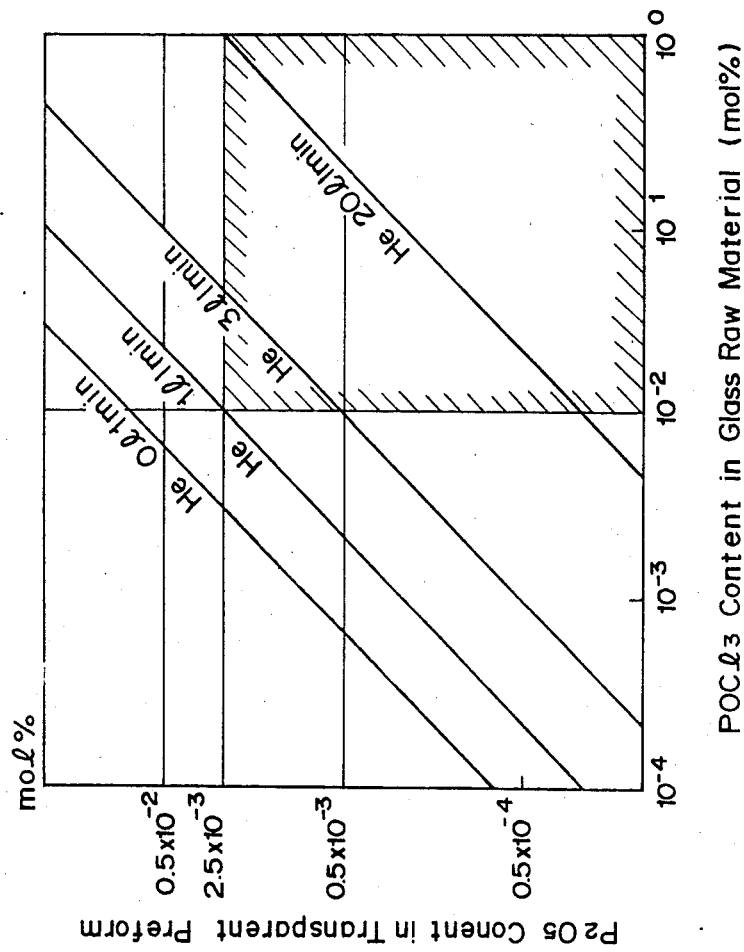
FIG. 1 is a graph illustrating changes of the $P_2O_5$ content against the content of $POCl_3$ in the glass raw material and the flow rate of helium in the sintering step.

The results are shown in FIG. 1, in which the $POCl_3$ content (mole %) in all the raw materials per burner is plotted as ordinate against the $P_2O_5$ content in the transparent preform as abscissa.

It can be seen from FIG. 1 that, in order to reduce the phosphorus content to $3 \times 10^{-3}$ % by mole or less in the transparent preform, the content of $POCl_3$ in the raw materials is not more than 0.003 % by mole when there was no flow (0 1/min.). The upper limit of the proportion of $POCl_3$ can, however, increase as the flow rate of helium during sintering increases. For example, the upper limit is $1 \times 10^{-2}$ % by mole at a helium flow rate of 1 1/min., $3 \times 10^{-2}$ % by mole at a helium flow rate of 3 1/min. and 1 % by mole at a helium flow rate of 20 1/min.

However, when the proportion of the phosphorous compound in the raw materials is not more than $1 \times 10^{-2}$ % by mole, not only the control of temperature during the production of the porous preform is difficult, but also the porous preform must be sintered at a temperature higher than 1,700° C. Such a high temperature deteriorates the life of the facilities including the furnace and the heater. Therefore, the helium flow rate during sintering of the porous preform is at least 1 1/min. A helium flow rate higher than 20 1/min. is not desirable since it increases production costs. Although the above explanation is made with reference to $POCl_3$ as a phosphorous compound, other phosphorous compounds such as $PCl_3$ and $PCl_5$ can also be used in an equivalent molar amount.

In addition to the phosphorous compound, the glass raw material mixture contains conventionally used materials for the production of the preform such as $SiCl_4$, $GeCl_4$, $BBr_3$, etc.

The inert gas in the sintering step may be helium, argon, nitrogen, etc. Among them, helium is preferred.

Other conditions for the production of the preform may be the same as in the conventional VAD or OVD method.

The above-specified conditions can be applied to a porous glass preform for a single mode optical fiber. In such case, addition of phosphorus not only facilitates the sintering step, but also makes distribution of the preform surface temperature and the bulk density homogeneous, thereby preventing cracking in the produced porous preform.

The optical fiber is drawn from the transparent preform produced by the method of the invention under the same condition as in the conventional methods.

The present invention will be hereinafter explained in detail by following Examples.

EXAMPLE 1

A porous glass preform for a multi-mode optical fiber was produced by the use of a concentric multi-tube burner according to the VAD method and then made transparent in a sintering furnace. The flow rates of the raw materials in the production of the porous glass preform and the sintering conditions are as follows:

Flow Rate of Raw materials (ml/min.)

$SiCl_4$: 80
$GeCl_4$: 20
$POCl_3$: 0.112

Sintering Conditions

Flow rate of helium: 5 1/min.
Temperature: 1,600° C.

The flow rates of the raw materials and of helium are values as determined under the normal state (at 0° C. under 1 atm.).

The thus obtained transparent preform has a length of 150 mm and a diameter of 25 mm. Its phosphorus content was $3.5 \times 10^{-4}$ %.

The preform was drawn at a draw rate (or draw ratio) of 100m/min. at a temperature of 2,000° C. to produce an optical fiber having a core diameter of 50 micrometers, a fiber outer diameter of 125 micrometers and n of 1 %. Its attenuation loss-wavelength curve is shown in FIG. 2.

Figure 2:
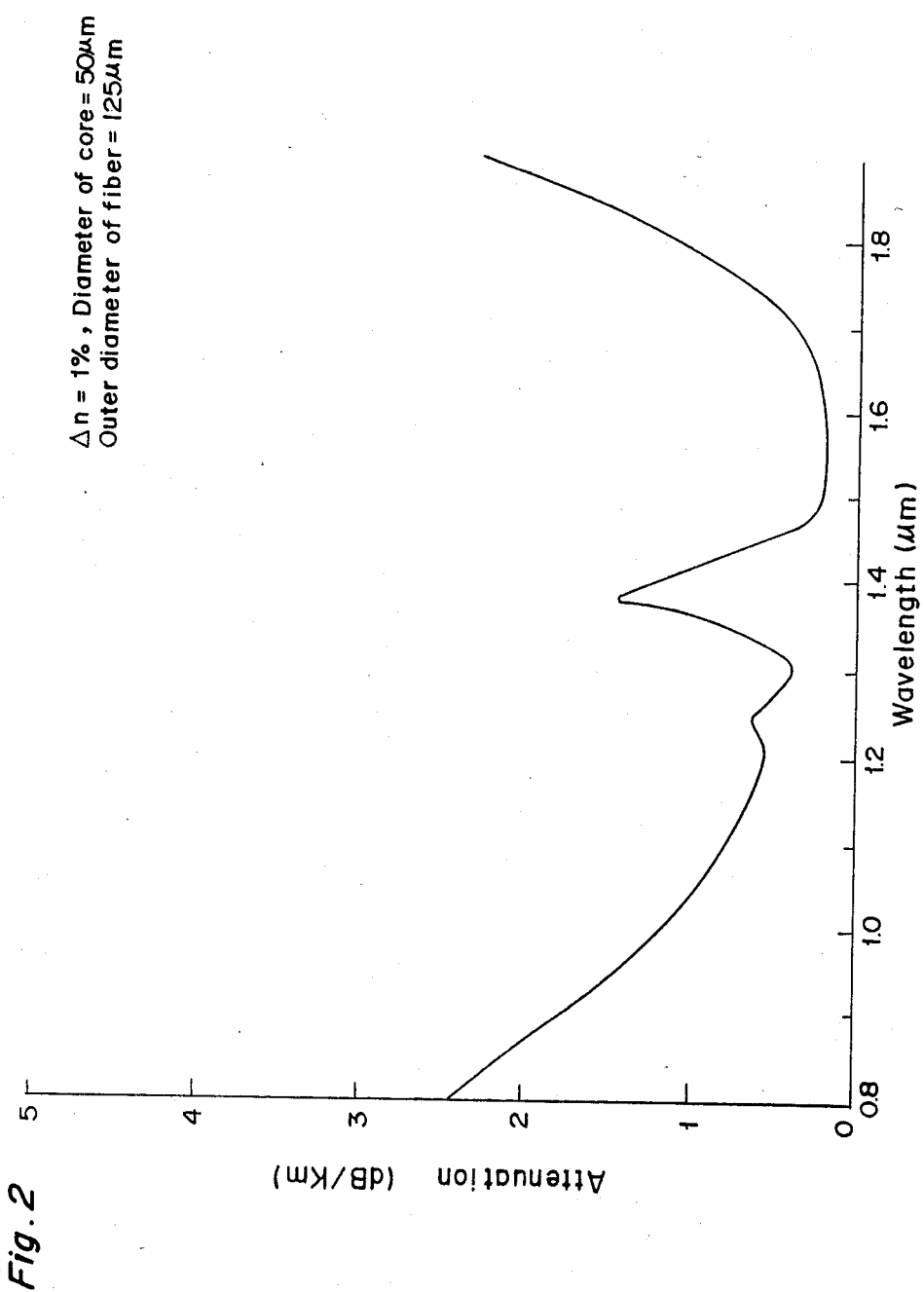
FIGS. 2 and 3 graphs illustrating relationship of attenuation and wavelength in the optical fibers produced in Example 1 and 2 respectively.

As apparent from FIG. 2, the absorption attributed to the P-O-H moieties at about 1.52 micrometers was not observed.

EXAMPLE 2

A porous glass preform for a single-mode fiber was produced by the use of three multi-tube burners according to the VAD process. One of the three burners was used to fabricate a core, and the other two burners, to fabricate a cladding. The flow rates of the raw materials during the production and the sintering conditions of the porous glass preform are as follows:

Flow Rate of Raw materials (ml/min)

First Burner
$SiCl_4$: 25
$GeCl_4$: 6
$POCl_3$: 0.03
Second and Third Burners
$SiCl_4$: 100
$POCl_3$: 0.2

Sintering Conditions

Flow rate of helium: 10 l/min.
Temperature: 1,600° C.

From the transparent preform has a length of 170 mm and a diameter of 35 mm. Its phosphorus content was $1 \times 10^{-3}$ % by mole.

The preform was drawn at a draw rate (or draw ratio) of 60m/min. at a temperature of 2,000° C. to produce an optical fiber having a core diameter of 8.5 micrometers, a fiber outer diameter of 125 micrometers and n of 0.27 %. Its attenuation loss-wavelength curve is shown in FIG. 3.

Figure 3:
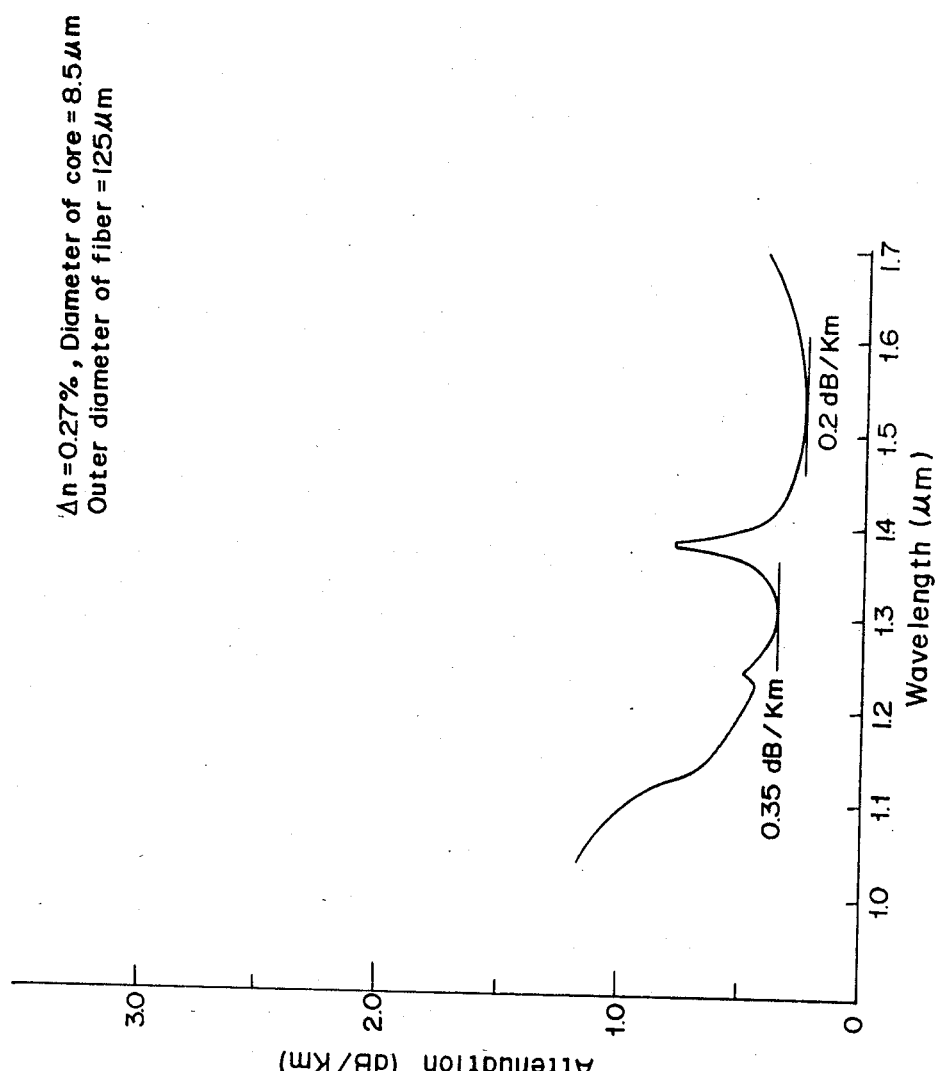

As apparent from FIG. 3, the absorption attributed to the P-O-H moieties at about 1.52 micrometers was not observed.

The term "sintering temperature" as used herein does not mean a temperature at which phosphorus is liberated or evaporated, but a maximum temperature until which all phosphorus is liberated. For example, "a sintering temperature of 1,600° C." means that the liberation of phosphorus is completed during the period that the porous glass preform is heated from a room temperature to 1,600° C.

What is claimed is:

1. A method for producing an optical fiber preform comprising the steps of
   (a) jetting a glass raw material mixture containing a silica forming compound and a germania forming compound and at least one phosphorous compound in an amount of from 0.01% to 1.0% by mole, based upon the total moles of said raw material mixture, and a fuel gas through a flame-forming burner;
   (b) hydrolyzing the raw materials in the flame of the burner to form fine doped-silica glass particles;
   (c) depositing the fine glass particles to form a porous glass preform; and then
   (d) sintering the porous glass preform at about 1600° C. in a stream of an inert gas having a flow rate of from 1 to 20 l/min until the glass preform is made transparent and controlling the sintering step to remove phosphorus from the preform to produce a transparent doped-silica optical fiber preform having a $P_2O_5$ content of less than $3.0 \times 10^{-3}$% by mole.

2. A method as claimed in claim 1, wherein step (c) is practiced by the steps of depositing the fine glass particles onto the tip of a rotating seed rod and growing the porous glass preform in the longitudinal direction of said seed rod.

3. A method as claimed in claim 1, wherein step (c) is practiced by the steps of depositing the fine glass particles in the form of layers on a rotating starting member and then removing the starting member.

4. A method as claimed in claim 1, wherein the glass raw material contains compounds which are hydrolyzed to form at least $GeO_2$ and $SiO_2$.

5. A method as claimed in claim 4, wherein the glass raw material comprises $SiCl_4$, $GeCl_4$ and at least one phosphorous compound selected from the group consisting of $POCl_3$, $PCl_3$ and $PCl_5$.

6. A method for producing an optical fiber comprising producing a transparent preform by the method as claimed in claim 1 and drawing it to form an optical fiber.

7. A method as claimed in claim 6, wherein the optical fiber is a single-mode optical fiber.

8. A method as claimed in claim 6, wherein the optical fiber is a multi-mode optical fiber.

* * * * *